(12) United States Patent
Kang et al.

(10) Patent No.: US 12,683,238 B2
(45) Date of Patent: Jul. 14, 2026

(54) BATTERY PACK CASE AND BATTERY PACK INCLUDING THE SAME

(71) Applicant: SK On Co., Ltd., Seoul (KR)

(72) Inventors: Min Song Kang, Daejeon (KR); Bon Seok Ku, Daejeon (KR); Byeong Jun Pak, Daejeon (KR); Jun Hee Jung, Daejeon (KR); Sei Hoon Cho, Daejeon (KR); Jin Su Han, Daejeon (KR); Jae Il Hwang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 944 days.

(21) Appl. No.: 17/870,963

(22) Filed: Jul. 22, 2022

(65) Prior Publication Data

US 2023/0022379 A1 Jan. 26, 2023

(30) Foreign Application Priority Data

Jul. 23, 2021 (KR) ........................ 10-2021-0097048

(51) Int. Cl.
| | |
|---|---|
| *H01M 50/367* | (2021.01) |
| *H01M 50/211* | (2021.01) |
| *H01M 50/24* | (2021.01) |
| *H01M 50/244* | (2021.01) |
| *H01M 50/249* | (2021.01) |
| *H01M 50/264* | (2021.01) |
| *H01M 50/271* | (2021.01) |

(52) U.S. Cl.
CPC ....... *H01M 50/367* (2021.01); *H01M 50/211* (2021.01); *H01M 50/24* (2021.01); *H01M 50/244* (2021.01); *H01M 50/249* (2021.01);

*H01M 50/264* (2021.01); *H01M 50/271* (2021.01); *H01M 2220/20* (2013.01)

(58) Field of Classification Search
CPC .......................... H01M 50/367; H01M 50/249
See application file for complete search history.

(56) References Cited

U.S. PATENT DOCUMENTS

| | | | |
|---|---|---|---|
| 11,063,316 | B2 | 7/2021 | Kim et al. |
| 11,217,857 | B2 | 1/2022 | Lindstrom et al. |
| 2016/0351980 | A1 | 12/2016 | Herntier et al. |
| 2018/0154754 | A1 | 6/2018 | Rowley et al. |
| 2020/0136213 | A1 | 4/2020 | Geskes et al. |
| 2020/0185672 | A1 | 6/2020 | Seo et al. |
| 2022/0059901 | A1* | 2/2022 | Ren ...................... H01M 50/249 |
| 2022/0181731 | A1* | 6/2022 | Zhang ................. H01M 50/249 |
| 2022/0209332 | A1* | 6/2022 | Jung ...................... B60L 50/64 |

FOREIGN PATENT DOCUMENTS

| | | |
|---|---|---|
| CN | 110190211 A | 8/2019 |
| CN | 112531246 A | 3/2021 |
| EP | 2506336 A1 | 10/2012 |
| EP | 4020676 A1 | 6/2022 |

(Continued)

*Primary Examiner* — Christopher P Domone
(74) *Attorney, Agent, or Firm* — The Webb Law Firm

(57) ABSTRACT

Provided are a battery pack case and a battery pack including the same. A battery pack case is capable of preventing heat from propagating from a trigger module to a normal module by providing a flow channel, through which gas generated during a thermal runaway situation is flowable, in frames constituting the battery pack case, and discharging the gas or like to the outside through the flow channel.

13 Claims, 14 Drawing Sheets

(56) References Cited

FOREIGN PATENT DOCUMENTS

| | | | |
|---|---|---|---|
| JP | 5749200 | B2 | 7/2015 |
| KR | 1020180113419 | A | 10/2018 |
| KR | 1020190022485 | A | 3/2019 |
| KR | 1020190069873 | A | 6/2019 |
| KR | 102061827 | B1 | 1/2020 |
| WO | 2020134051 | A1 | 7/2020 |

* cited by examiner

【FIG. 1】
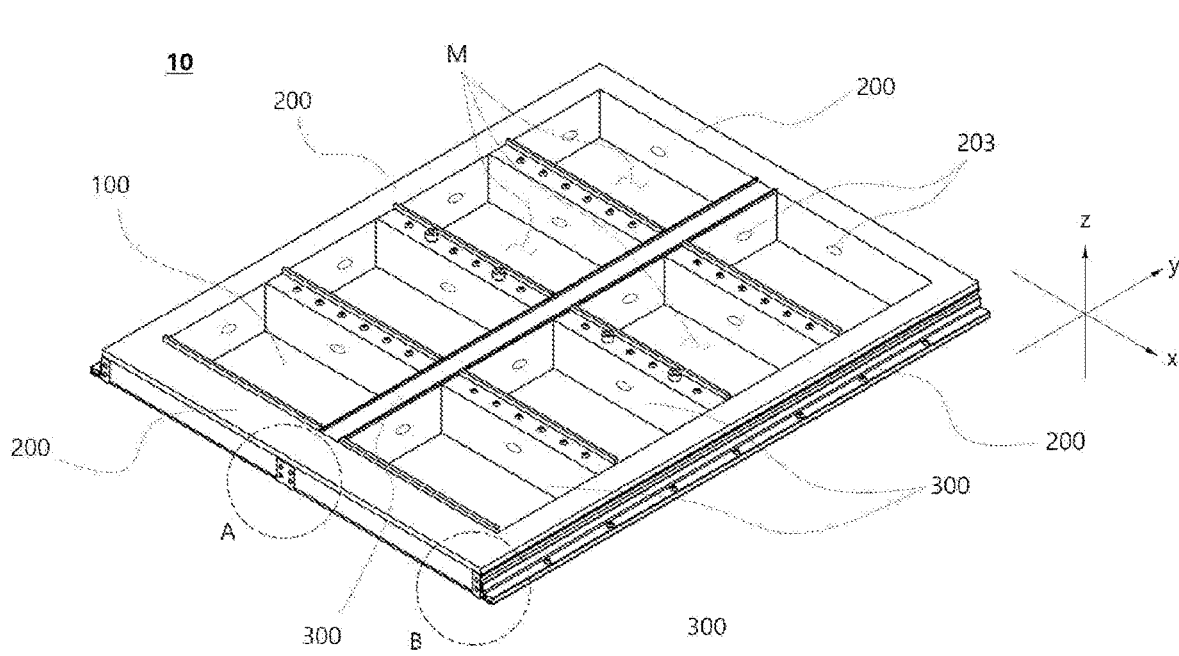

【FIG. 2】
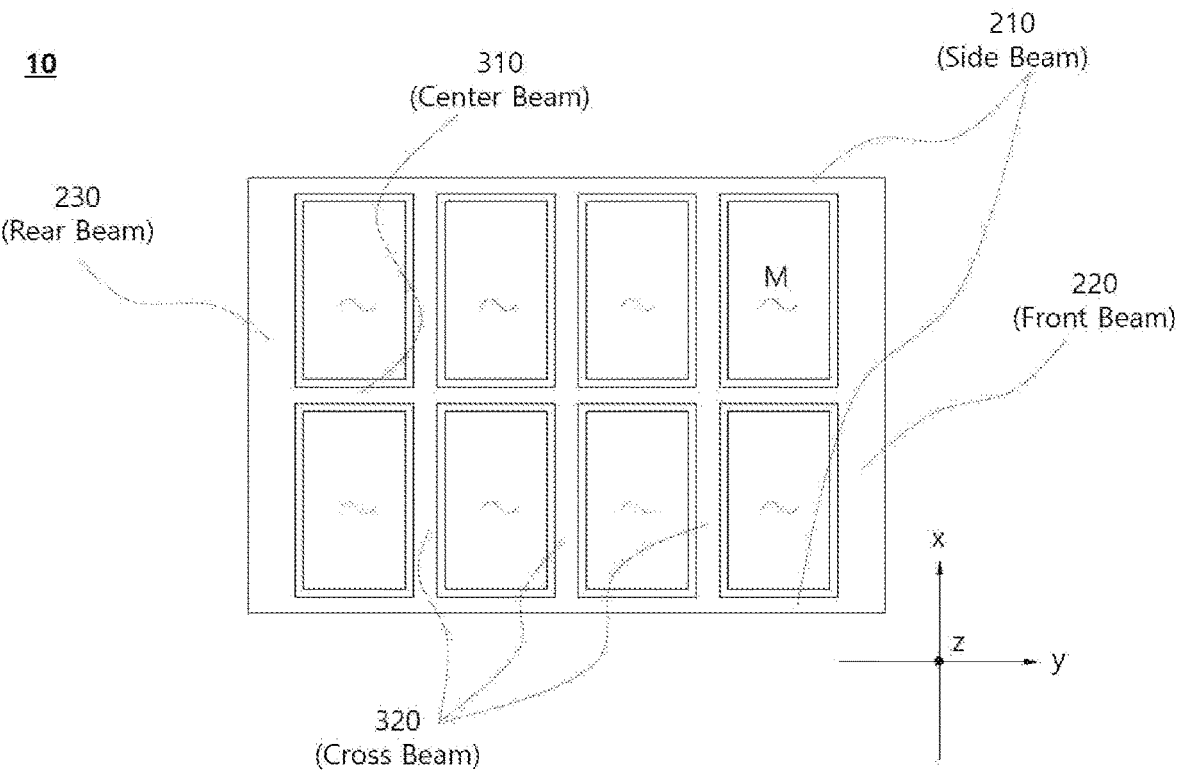

【FIG. 3】
10
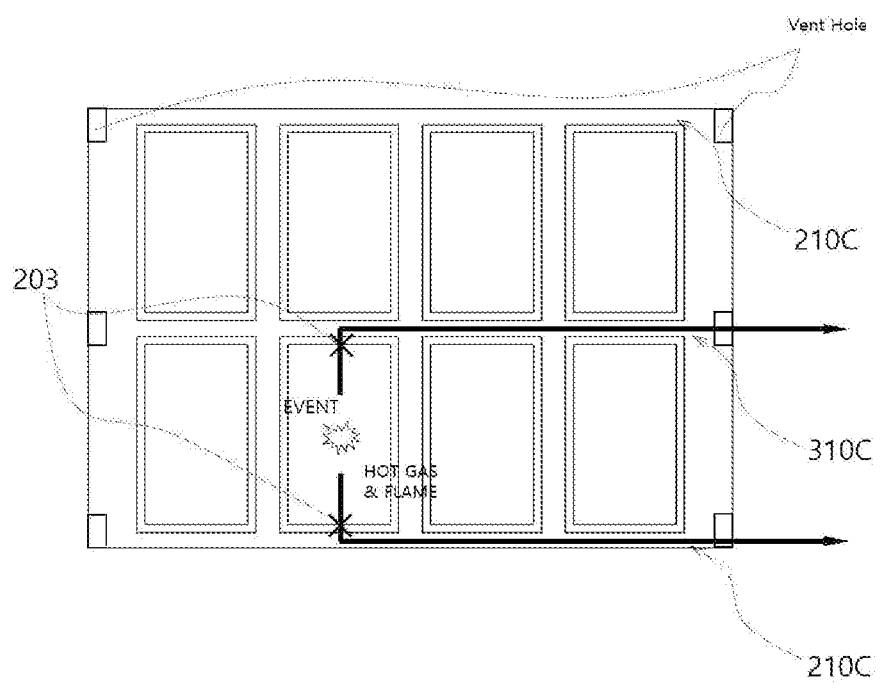

【FIG. 4】
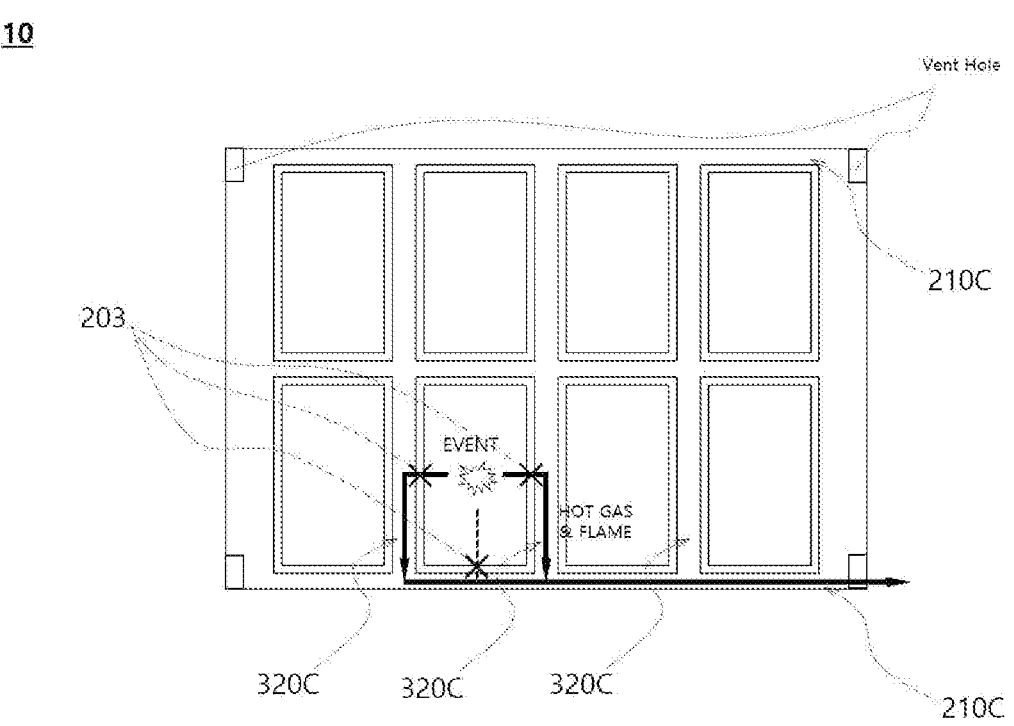

【FIG. 5】
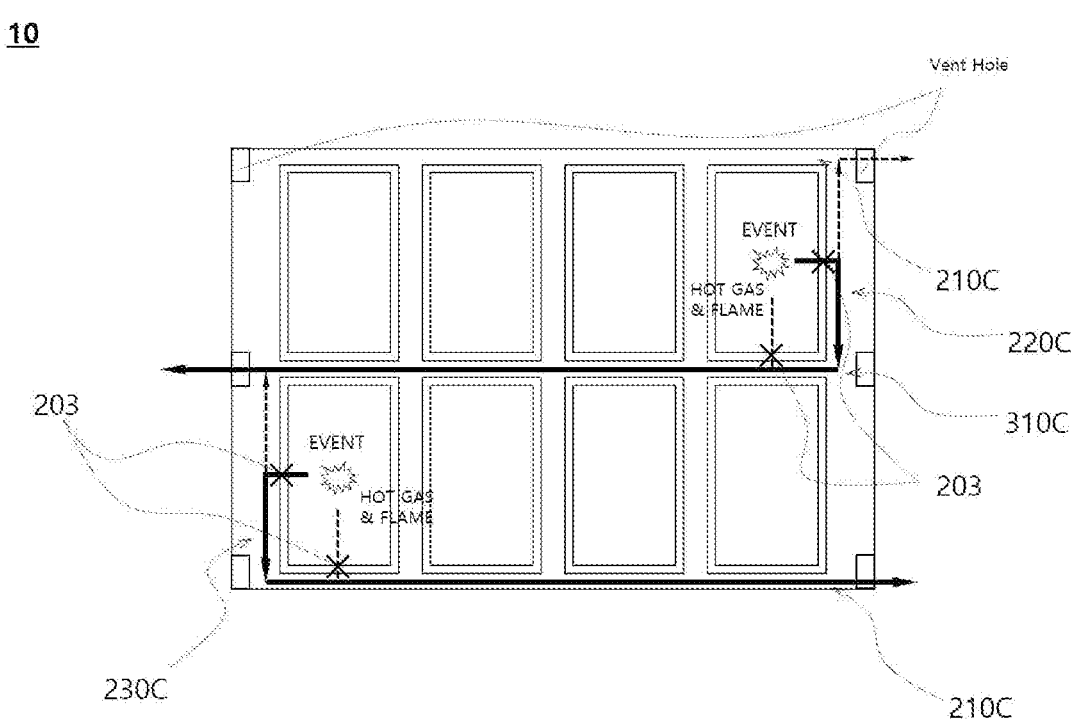

【FIG. 6】
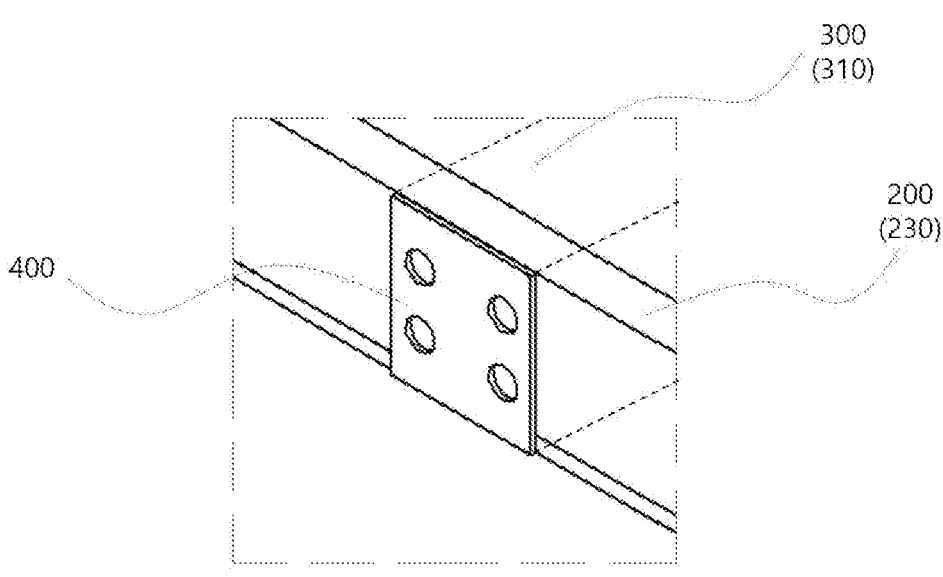

【FIG. 7】
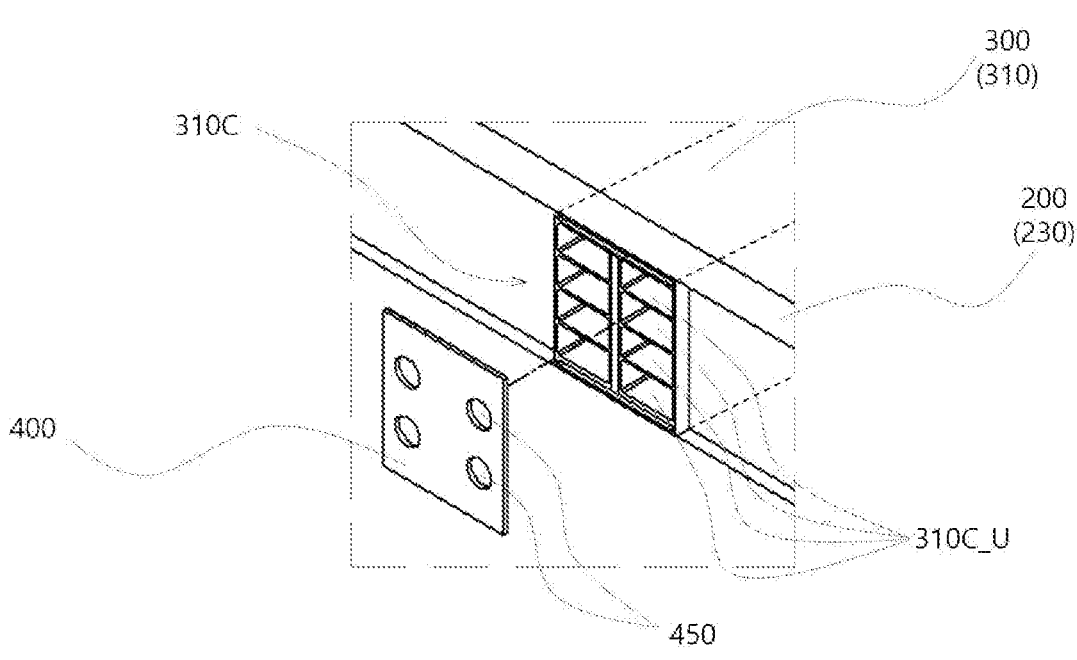

【FIG. 8】
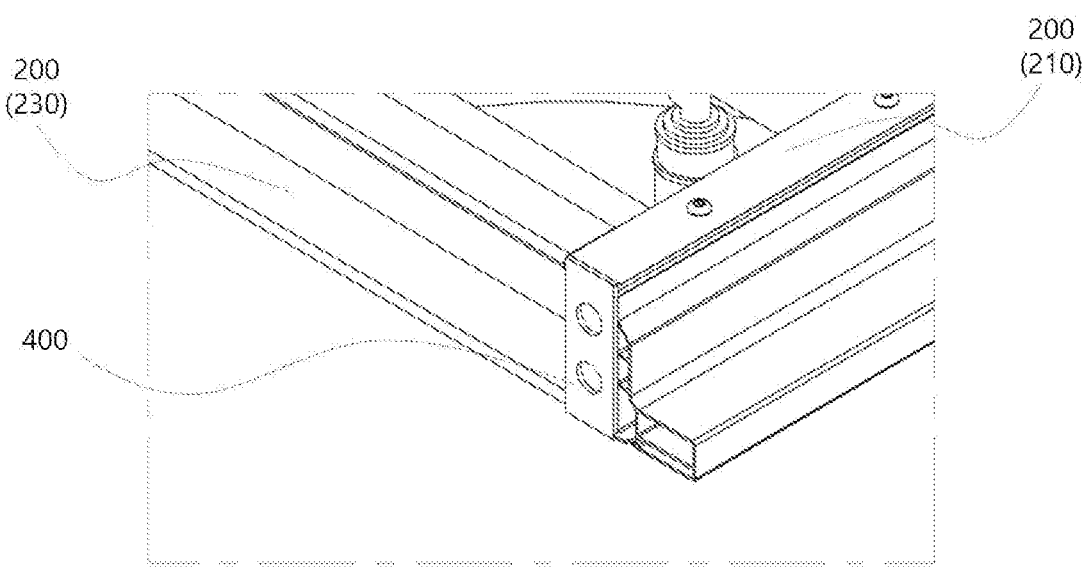

【FIG. 9】
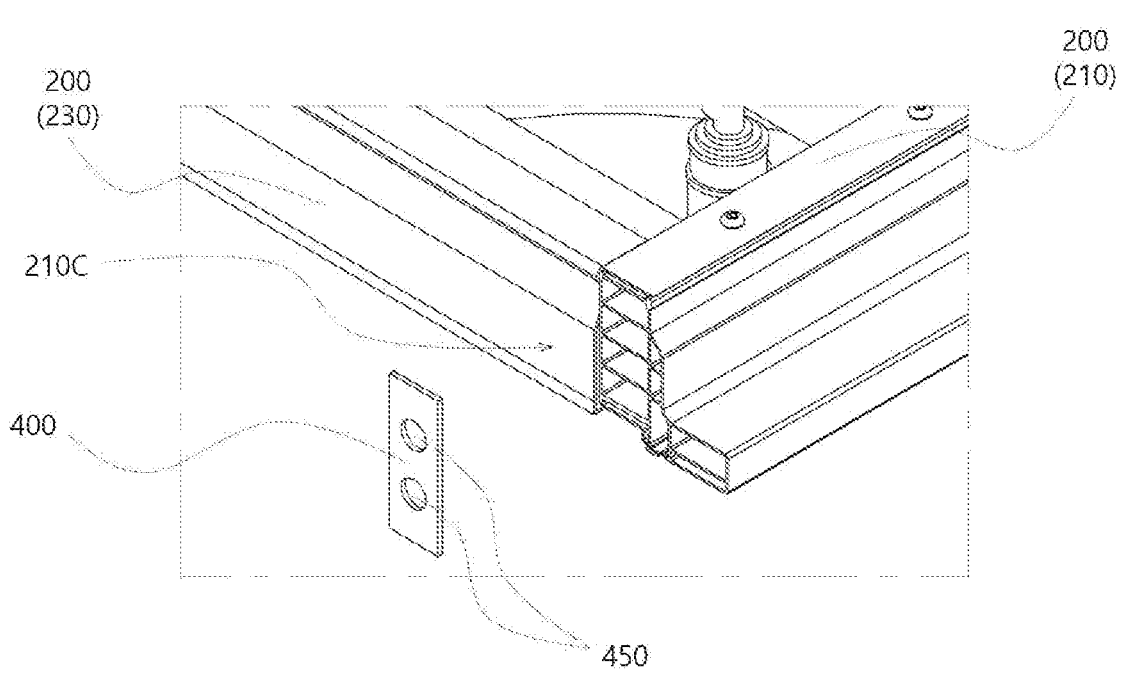

【FIG. 10】
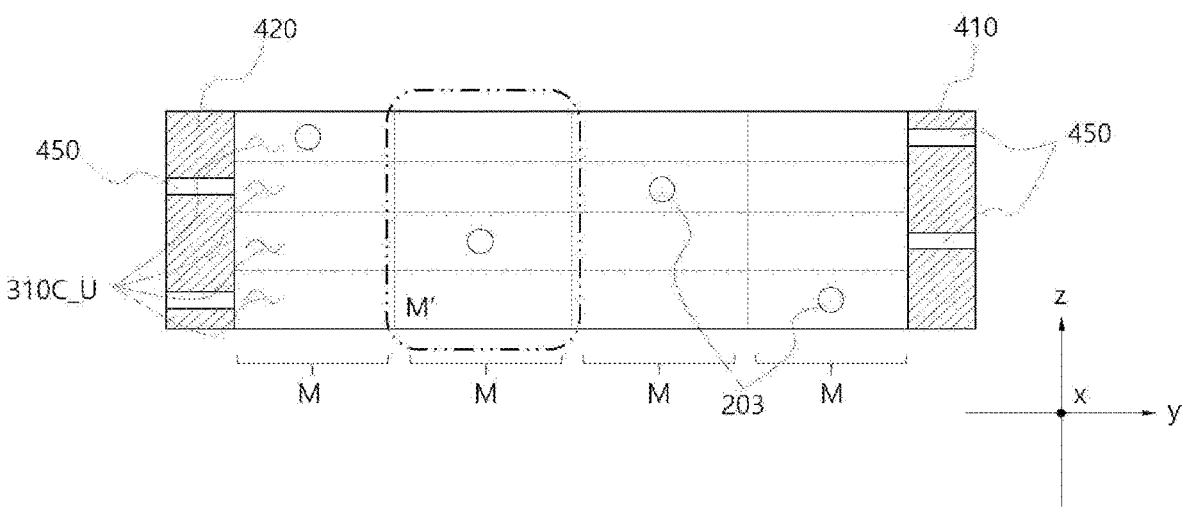

【FIG. 11】
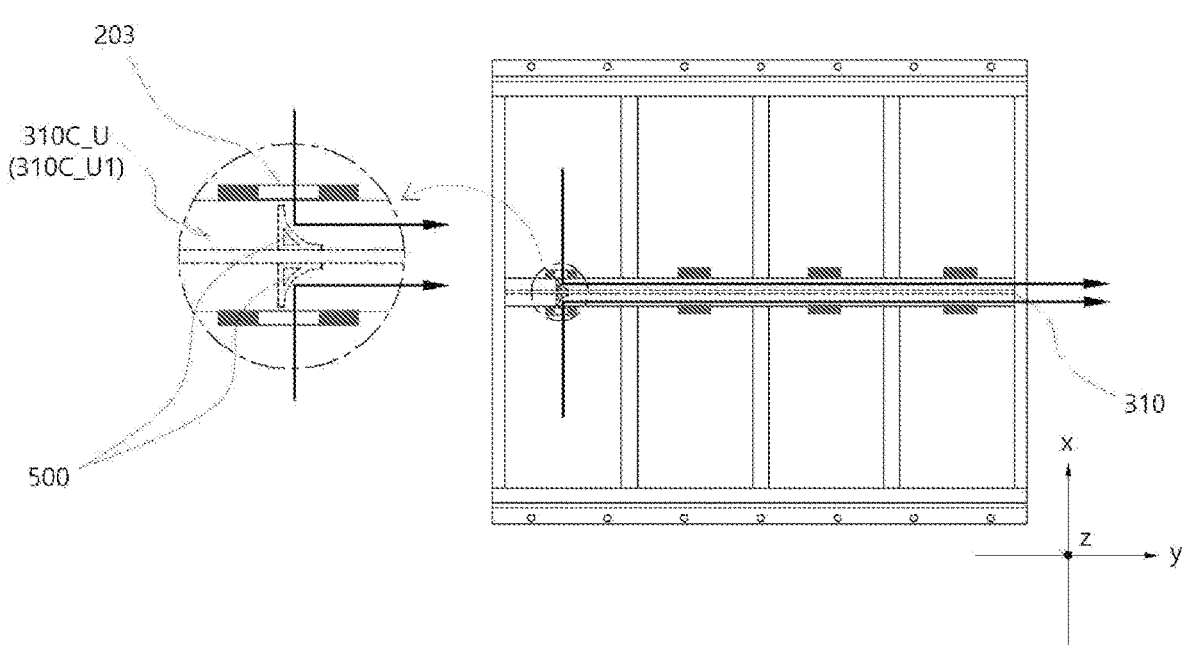

【FIG. 12】
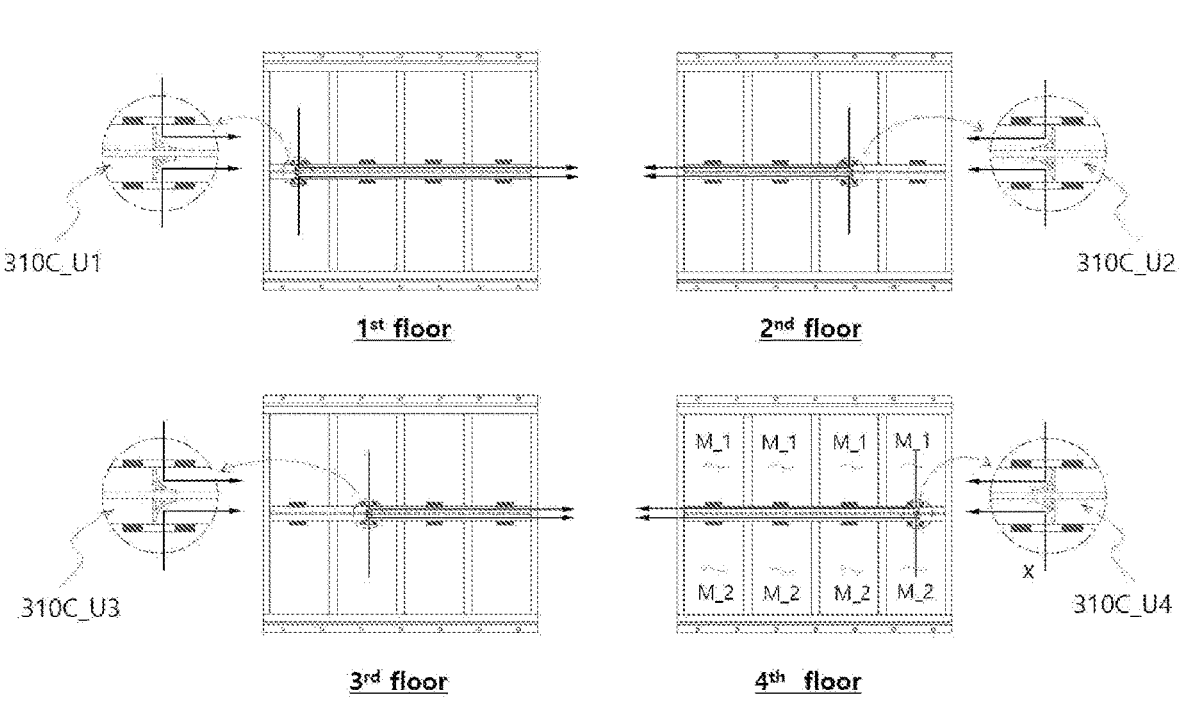

【FIG. 13】
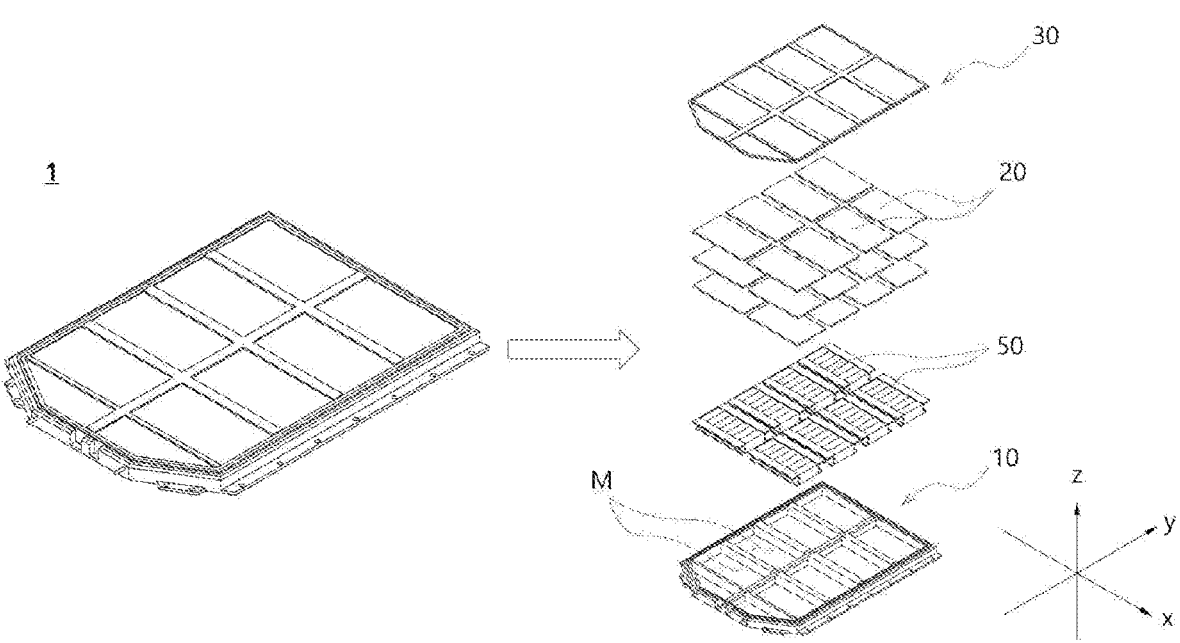

【FIG. 14】
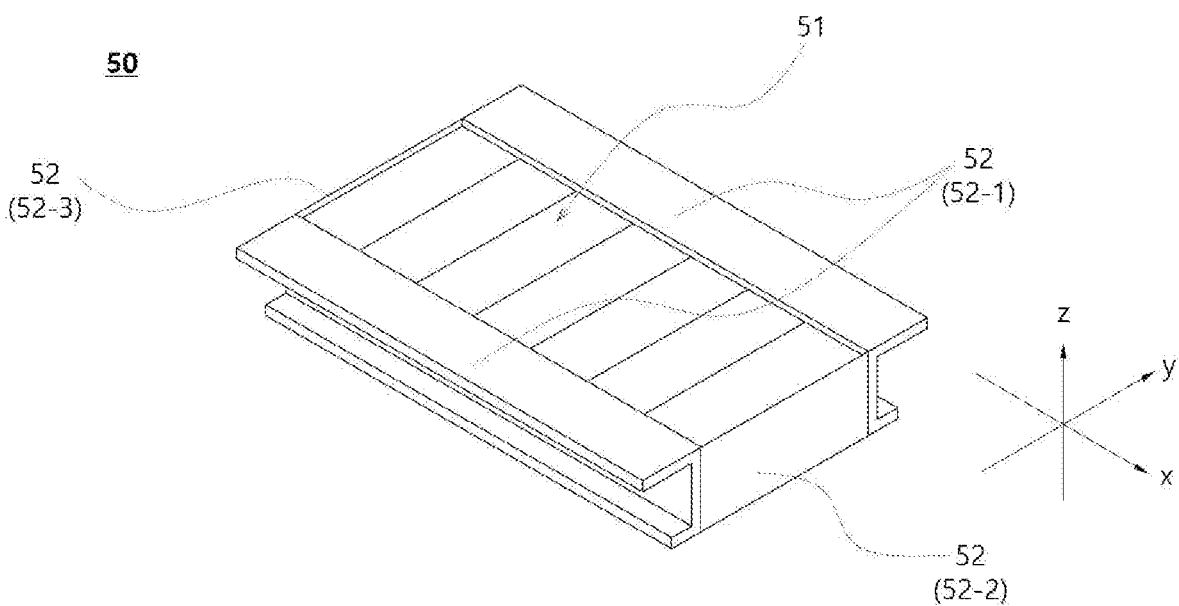

BATTERY PACK CASE AND BATTERY PACK INCLUDING THE SAME

CROSS-REFERENCE TO RELATED APPLICATION

This application claims priority to Korean Patent Application No. 10-2021-0097048, filed Jul. 23, 2021, the disclosure of which is hereby incorporated by reference in its entirety.

BACKGROUND OF THE INVENTION

Field of the Invention

The following disclosure relates to a battery pack case and a battery pack including the same, and more particularly, to a battery pack case capable of preventing heat from propagating from a trigger module to a normal module by providing a flow channel, through which gas generated during a thermal runaway situation is flowable, in frames constituting the battery pack case, and discharging the gas or like to the outside through the flow channel, and a battery pack including the same.

Description of Related Art

Secondary batteries that are easy to apply according to product groups and have electrical characteristics such as high energy density are universally applied not only to portable devices, but also to an electric vehicle (EV) or a hybrid vehicle (HEV) driven by an electric driving source. These secondary batteries are attracting attention as a new energy source to improve eco-friendliness and energy efficiency because they not only have the primary advantage of dramatically reducing the use of fossil fuels, but also do not generate any by-products from the use of energy.

The types of secondary batteries currently widely used may include a lithium ion battery, a lithium polymer battery, a nickel cadmium battery, a nickel hydride battery, a nickel zinc battery, and the like. An operating voltage of the unit secondary battery cell, that is, the unit battery cell, is about 2.5 V to 4.6 V. Accordingly, when a higher output voltage is required, a plurality of battery cells are connected in series to constitute a battery pack. In addition, a plurality of battery cells may be connected in parallel to constitute a battery pack according to the charge/discharge capacity required for the battery pack. Accordingly, the number of battery cells included in the battery pack may be variously set according to the required output voltage or charge/discharge capacity.

On the other hand, in the case of constituting the battery pack by connecting the plurality of battery cells in series/parallel, a method of constituting a battery pack by first configuring a battery module including at least one battery cell and adding other components using the at least one battery module is generally used. Here, there may be generally provided a pouch type secondary battery in which the battery cells constituting the battery module or the battery pack may be easily stacked with each other.

In the case of the battery module, a thermal runaway situation may occur in which the battery cells are ignited inside the case due to overcharging, etc. In this case, high-temperature and high-pressure gas, flame, metal particles, or the like may be generated from the corresponding trigger cells or a trigger module including the same. There is a risk that, when the flame or the like generated from the trigger module is exposed outside a case, it may lead to greater secondary damage, and when the high-temperature and high-pressure gas does escape out of the case, the battery module may explode due to the increase in internal pressure of the case, and the like. In order to solve this, conventionally, a venting valve or the like is provided in a certain area of the battery pack case to discharge gas, etc., generated from the trigger module to the outside of the pack when an issue occurs.

However, according to the structure of the conventional pack case, since the venting valve is commonly used in the entire inner space of the pack case, the harmful substances generated from the trigger module have spread throughout the pack, and then may be discharged to the outside through the venting valve, which may adversely affect normal modules other than the trigger module.

RELATED ART DOCUMENT

Patent Document (Patent Document 1) Korea Patent Publication No. 2061827 (Dec. 26, 2019)

SUMMARY OF THE INVENTION

An embodiment of the present invention is directed to providing a battery pack case capable of preventing heat from propagating from a trigger module to a normal module by providing a flow channel, through which gas generated during a thermal runaway situation is flowable, in frames constituting the battery pack case, and discharging the gas or like to the outside through the flow channel, and a battery pack including the same.

In one general aspect, a battery pack includes: a plate on which battery modules are disposed; an outer frame that is formed on an outer side of the plate with a predetermined height; and a partition frame partitioning an inner space formed by the plate and the outer frame into a plurality of module spaces, in which a flow channel through which a fluid flows is provided in at least one of the outer frame or the partition frame or combination thereof.

The flow channel may include a first flow channel and a second flow channel separated from each other.

The plurality of module spaces may include a first module space and a second module space adjacent to each other, the first module space may communicate with the first flow channel, and the second module space may communicate with the second flow channel. The fluid may include a gas generated during a thermal runaway situation of the battery modules, and a flow channel of the outer frame and a flow channel of the partition frame may communicate with each other.

The partition frame may include a center beam disposed in a front-rear direction on the plate, a center beam flow channel may be formed inside the center beam, and the center beam flow channel may communicate with outside at one end or the other end of the center beam flow channel.

The partition frame may include a cross beam disposed in a left-right direction on the plate, a cross beam flow channel may be formed inside the cross beam, and the cross beam flow channel may communicate with a side beam flow channel formed inside a side beams that are each disposed on both sides of the plate in the left-right direction of the outer frame.

The partition frame may include a front beam disposed in a front and a rear beam disposed in a rear on the plate, a front beam flow channel and a rear beam flow channel may be each formed in at least one of the front beam and the rear beam, and the front beam flow channel and the rear beam flow channel may each communicate with the side beam flow channel.

The center beam flow channel may have a multilayer structure in which a plurality of center beam unit flow channels are stacked in a height direction.

Each of the plurality of center beam unit flow channels may be partitioned left and right.

The outer frame may include side beams that are each disposed on both sides of the plate in the left-right direction, a side beam flow channel may be formed inside the side beam, and at least one of one end and the other end of the side beam flow channel may communicate with the outside.

The partition frame may include a cross beam flow channel disposed in the left-right direction on the plate, a cross beam flow channel may be formed inside the cross beam, and the cross beam flow channel may communicate with the side beam flow channel.

The partition frame may include a front beam disposed in a front and a rear beam disposed in a rear on the plate, a front beam flow channel and a rear beam flow channel may be each formed in at least one of the front beam and the rear beam, and the front beam flow channel and the rear beam flow channel may each communicate with the side beam flow channel.

The battery pack may further include: a plurality of module space covers that are provided on each of the upper portions of the plurality of module spaces to shield the respective module spaces; and a battery pack cover that is the upper portions of the plurality of module space covers and shields the battery pack case as a whole.

The battery pack may further include: a battery module that is individually seated in each of the plurality of module spaces, in which the battery module may include a battery cell assembly including a pouch type battery cell and a module case for fixing the battery cell assembly, and the pouch type battery cell may be directly seated on the plate through a heat conduction member.

In another general aspect, an electric vehicle includes: the battery pack described above; and a motor that receives power from the battery pack.

BRIEF DESCRIPTION OF THE DRAWINGS

FIG. 1 is a perspective view schematically illustrating a battery pack case according to an exemplary embodiment of the present invention.

FIG. 2 is a diagram schematically illustrating FIG. 1 viewed from the top.

FIG. 3 is a diagram schematically illustrating a battery pack case according to an example of the present invention.

FIG. 4 is a diagram illustrating a battery pack case according to another example of the present invention.

FIG. 5 is a diagram illustrating a battery pack case according to still another example of the present invention.

FIG. 6 is an enlarged view of area A of FIG. 1, and FIG. 7 is an exploded perspective view of FIG. 6.

FIG. 8 is an enlarged view of area B of FIG. 1, and FIG. 9 is an exploded perspective view of FIG. 8.

FIG. 10 is a conceptual diagram illustrating a connection relationship between a module space and a center beam unit flow channel.

FIG. 11 is a diagram illustrating one center beam unit flow channel, a communication hole, and a guide member.

FIG. 12 is an exploded view of a case in which each center beam unit flow channel is shown for each floor.

FIG. 13 is an exploded perspective view of a battery pack according to an exemplary embodiment of the present invention.

FIG. 14 is a diagram illustrating a battery module according to an example of the present invention.

DETAILED DESCRIPTION OF MAIN ELEMENTS

1: Battery pack
10: Battery pack case
100: Plate
200: Outer frame
210: Side beam
210C: Side beam flow channel
220: Front beam
220C: Front beam flow channel
230: Rear beam
230C: Rear beam flow channel
300: Partition frame
310: Center beam
310C: Center beam flow channel
320: Cross beam
320C: Cross beam flow channel
400: Vent cap
500: Guide member
20: Module space cover
30: Battery pack cover
50: Battery module

DESCRIPTION OF THE INVENTION

Hereinafter, the present invention will be described in detail with reference to the accompanying drawings.

FIG. 1 is a perspective view schematically illustrating a battery pack case according to an example of the present invention, and FIG. 2 is a diagram schematically illustrating FIG. 1 viewed from the top. A battery pack case 10 of the present invention may largely include a plate 100, an outer frame 200, and a partition frame 300.

The plate 100 provides a space in which the battery modules are disposed, and may be configured in a flat plate shape having an approximately large area, and may be positioned under the battery modules to cover lower portions of each of the battery modules.

The outer frame 200 is formed on an outer side of the plate 100 with a predetermined height, and the outer frame 200 may include side beams 210 each disposed on both sides of the plate in a left-right direction (x-direction in FIG. 1, same as below), and a front beam 220 and a rear beam 230 each disposed on both sides of the outer frame in the front-rear direction (y-direction in FIG. 1, same as below), and these beams may be disposed in front, side, and behind the plate, respectively, to cover side surfaces of the battery modules.

The partition frame 300 partitions an inner space formed by the plate 100 and the outer frame 200, that is, an inner space defined in a box shape by the plate and the outer frame into a plurality, and the partition frame 300 may be provided with one or more center beams 310 and cross beams 320 in a lattice form. The center beam 310 may refer to a frame disposed on the plate in the front-rear direction and the cross beam 320 may refer to a frame disposed on the plate in the left-right direction. In the illustrated battery pack case, it is illustrated that one center beam is provided and three cross beams are provided, but a plurality of center beams may also be provided like the cross beams, and one cross beam may also be provided. As described above, the inner space of the case may be divided into a plurality of zones by the partition frame 300, that is, the center beam 310 and the cross beam 320, and battery modules may be individually seated in each zone. In this case, each zone is defined as a module space M in the present invention.

In this case, in the battery pack 10 of the present invention, a flow channel through which gas, flame, or the like generated during a thermal runaway situation of the battery modules is flowable may be provided inside at least one of the outer frame 200 or the partition frame 300 or combination thereof. In this specificaion, the description "at least one of A and(or) B" may mean "A", "B", or "A and B". As described above, in the battery module, the thermal runaway situation may occur in which the battery cells are ignited due to overcharging or the like. In this case, high-temperature and high-pressure gas, flame, metal particles, or the like may be generated from a trigger cell in which the battery cell is ignited or the trigger module which is the battery module including the same. According to the present invention, a flow channel through which the gas, the flame, or the like generated during the thermal runaway situation is flowable is provided inside the frames constituting the battery pack case, so gas, flame, or the like may be introduced through the flow channel and discharged to the outside.

Here, each module space M may have a structure in which the side surfaces are surrounded by the partition frame 300 (for example, the module space surrounded by the center beam and the cross beam when two or more center and cross beams are provided), and may have a structure in which the side surfaces are surrounded by the outer frame 200 and the partition frame 300. In this case, at least one of the frames 200 and 300 surrounding each module space M may be provided with one or more communication holes 203 for communicating each module space and the flow channel on one side. Therefore, gas, flame, or the like generated when an issue occurs in the battery module seated in each module space M may be introduced into the flow channel formed inside the frames 200 and 300 through the communication hole 203.

In this case, each module space M may be formed as a space closed by frames 200 and 300 surrounding the side surfaces of each module space, a module space cover 20 and a battery pack case cover 30 that close the upper portions of each module space as described later, and the like, so each module space may be spatially separated from other module spaces.

Accordingly, according to the present invention, when an issue occurs in a specific battery module seated in one module space, the gas, the flame, or the like generated from the trigger module may not penetrate into other module spaces, and may be discharged to the outside through the flow channel provided inside the frames through the communication holes provided in the module spaces to block heat from propagating to other normal modules, thereby minimizing the adverse effect on the normal module.

In this case, the flow channel of the present invention may include a first flow channel and a second flow channel separated from each other. For example, when the flow channel is formed inside a side beam among the outer frames, the flow channel inside the side beam may be configured as a plurality of unit flow channels separated from each other. In this case, two unit flow channels among the plurality of unit flow channels may be referred to as the first flow channel and the second flow channel, respectively. The plurality of unit flow channels may be formed in the form in which they are stacked with each other as described below, but is not limited thereto, and may be formed in any form in which each unit flow channel is separated from each other.

In addition, in the present invention, the plurality of module spaces may include a first module space and a second module space adjacent to each other. Referring back to FIG. 2, the battery pack of FIG. 2 may include a total of eight module spaces. Among those, two module spaces adjacent to each other may be referred to as the first module space and the second module space, respectively. For example, a module space at the top left in the drawing may correspond to the first module space, and a module space adjacent to the first module space in a horizontal direction and located immediately to the right of the first module space may correspond to the second module space. Alternatively, the module space at the top left in the drawing may correspond to the first module space, and a module space adjacent to the first module space in a vertical direction and located immediately under the first module space may correspond to the second module space.

In this case, in the present invention, the first module space may communicate with the first flow channel, and the second module space may communicate with the second flow channel. That is, different module spaces may communicate with different flow channels, so each module space may have each dedicated flow channel. For example, it will be described with reference to FIG. 2 again. In the drawing, a total of four module spaces may be formed in the upper portion with respect to the center beam, and are referred to as module spaces 1, 2, 3, and 4 from the left, respectively. The flow channel is formed inside the side beam located on the upper portion in the drawing, and the corresponding flow channel may include four unit flow channels separated from each other, which are referred to as unit flow channels 1, 2, 3, and 4, respectively. In this case, as the module space 1 communicates with the unit flow channel 1, the module space 2 communicates with the unit flow channel 2, the module space 3 communicates with the unit flow channel 3, and the module space 4 communicates with the unit flow channel 4, each module space communicates with different unit flow channels, so each dedicated flow channel may be provided in each module space.

Furthermore, according to the present invention, the flow channels are respectively formed inside the outer frame and inside the partition frame. In this case, the flow channel of the outer frame and the flow channel of the partition frame may communicate with each other. For example, the flow channel may be formed inside the side beam of the outer frame, the flow channel may be formed inside the cross beam among the partition frames, and the flow channel of the side beam and the flow channel of the cross beam communicate with each other. In addition, the flow channel of the side beam may include the plurality of unit flow channels, that is, the first and second flow channels, and the flow channel of the cross beam may include the plurality of unit flow channels, that is, the first and second flow channels. In this case, the first flow channel of the side beam and the first flow channel of the cross beam may communicate with each other, and the second flow channel of the side beam and the second flow channel of the cross beam may communicate with each other, so the entire flow channel formed inside the frames may have a structure including the first flow channel and the second flow channel separated from each other.

FIG. 3 is a diagram illustrating a battery pack case according to an example of the present invention. As illustrated, in the battery pack case of the present example, a side beam flow channel 210C or a center beam flow channel 310C corresponding to the above-described flow channel may each be formed inside at least one of the side beam 210 of the outer frame 200 and the center beam 310 of the partition frame 300. The side beam flow channel 210C and the center beam flow channel 310C may have a structure in which at least one of one end portion and the other end portion communicates with the outside, and at least one of the side beam 210 and the center beam 310 may be provided with the above-described communication hole 203, that is, one or more communication holes through which each module space and the flow channels communicate with each other.

In other words, in the battery pack case 10 of the present example, the side beam flow channel 210C may be formed inside the side beam 210, the center beam flow channel 310C may be formed inside the center beam 310, or the side beam flow channel 210C may be formed inside the side beam 210 and at the same time, the center beam flow channel 310C may be formed inside the center beam 310. In this case, the side beam flow channel 210C or the center beam flow channel 310C has a structure in which at least one of the both end portions communicate with the outside, and as a result, as illustrated, may be configured so that gas, flame, or the like may be introduced into at least one of the cross beam and the center beam and discharged to the outside. In this case, the side beam flow channel or the center beam flow channel may communicate with the outside through vent holes provided at end portions of each flow channel, for example.

More specifically, in the battery pack case according to the example of FIG. 3, the side beam flow channel 210C and the center beam flow channel 310C may be formed inside the side beam 210 and the center beam 310, respectively, and the communication hole 203 may be formed in the side beam 210 and the center beam 310 surrounding each module space M, so, when gas, flame, or the like occur in any one module space M, the gas, the flame, or the like may be directly introduced into the side beam and the center beam through the communication hole 203 and discharged to the outside. In this case, in the case of the battery pack case illustrated in FIG. 3, one end portion of the side beam flow channel 210C and the center beam flow channel 310C, that is, only the right end portion in the drawing may be opened, and the other end portion may have a closed structure, but is not limited thereto, and both end portions may have an opened structure. In addition, in the battery pack case 10 of FIG. 3, the flow channels may be formed inside both the side beam 210 and the center beam 310, but the flow channel may be formed in only any one of the side beam 210 and the center beam 310. Hereinafter, in the present specification, a description such as "at least one of the side beam and the center beam" will be described in the same manner as the "side beam and/or center beam."

FIG. 4 illustrates a battery pack case according to another example of the present invention. In the battery pack case of this example, a cross beam flow channel 320C may be further formed inside the cross beam 320 of the partition frame 300 in the battery pack case of the above-described example, the cross beam flow channel 320C may communicate with at least one of the side beam flow channel 210C and the center beam flow channel 310C, and one or more communication holes 203 described above may be further formed in the cross beam 320. That is, the battery pack case of this example may be configured in a structure in which, in the battery pack case of the above-described example, the cross beam flow channel 320C is additionally formed inside the cross beam 320 disposed in the left-right direction on the plate 100, and communicates with the side beam flow channel 210C and/or the center beam flow channel 310C that communicates with the outside, so gas or the like may be introduced into the cross beam flow channel, transmitted to the side beam flow channel and/or the center beam flow channel, and discharged to the outside.

More specifically, in the battery pack case according to the example of FIG. 4, the side beam flow channel 210C may be formed in the side beam 210, the cross beam flow channel 320C is formed in the cross beam 320, and the communication hole 203 may be formed in the cross beam 320 surrounding each module space M, and thus, gas, flame, or the like generated from the trigger module may be introduced into the cross beam flow channel 320C through the communication hole formed in the cross beam 320 and transmitted to the cross beam flow channel 320C, so the gas, the flame, or the like may be discharged to the outside along the side beam flow channel 210C. In this case, as described above, in the battery pack case of this example, the center beam flow channel may be formed not only inside the side beam but also the center beam, and both end portions of the side beam flow channel and the center beam flow channel may have an opened structure.

FIG. 5 illustrates a battery pack case according to another example of the present invention. In the battery pack case 10 of this example may be configured in a structure in which, in the battery pack case of the example described above, the front beam flow channel 220C and the rear beam flow channel 230C are further formed inside at least one of the front beam 220 and the rear beam 230 of the outer frame 200, respectively, and the front beam flow channel 220C and the rear beam flow channel 230C communicate with at least one of the side beam flow channel 210C and the center beam flow channel 310C, and the front beam 220 and the rear beam 230 may be further provided with one or more communication hole 203 described above. That is, the battery pack case of this example may be configured in a structure in which, in the battery pack case of the above-described example, the front beam flow channel 220C and the rear beam flow channel 230C may be additionally formed inside the front beam 220 and/or the rear beam 230, respectively, disposed on both front and rear sides on the plate 100, and may communicate with the side beam flow channel 210C and/or the center beam flow channel 310C communicating with the outside, so gas or the like may be introduced into the front beam or the rear beam, transmitted to the side beam flow channel and/or the center beam flow channel, and discharged to the outside.

More specifically, in the battery pack case according to the example of FIG. 5, the flow channel may be formed in both the side beam 210 and the center beam 310, the front beam flow channel 220C and the rear beam flow channel 230C may be formed in the front beam 220 and the rear beam 230, respectively, and the communication hole may be formed in the front beam 220 and the rear beam 230 surrounding each module space M, so the gas, the flame, or the like generated from the trigger module may be introduced into the front beam flow channel and/or the rear beam flow channel through the communication holes formed in the front beam and the rear beam and transmitted to the side beam flow channel and/or the center beam flow channel, and may be discharged to the outside along the side beam flow channel and/or the center beam flow channel. Here, the battery pack case of FIG. 5 illustrates that the flow channels are formed in both the front beam and the rear beam, respectively. However, the flow channel may be formed in only one of the front beam and the rear beam.

Furthermore, although not illustrated separately, in the battery pack case according to the example of FIG. 3 may be configured in a structure in which each flow channel is formed inside the cross beam 320, the front beam 220, and the rear beam 230, and communicates with the side beam flow channel 210C and/or the center beam flow channel 310C. In addition, when the flow channel is further formed inside the cross beam, the front beam, and/or the rear beam in addition to the side beam or the center beam, gas, flame, or the like may be introduced into the cross beam flow channel, the front beam flow channel, and/or the rear beam flow channel, transmitted to the side beam flow channel and/or the center beam flow channel, and then discharged to the outside, and at the same time, may be directly introduced from one module space into the side beam flow channel and/or the center beam flow channel and discharged to the outside.

FIG. 6 is an enlarged view of area A of FIG. 1, FIG. 7 is an exploded perspective view of FIG. 6, FIG. 8 is an enlarged view of area B of FIG. 1, and FIG. 9 is an exploded perspective view of FIG. 8. The center beam flow channel 310C may be formed inside the center beam 310 as illustrated in FIG. 7, and separately or simultaneously, the side beam flow channel 210C may be formed inside the side beam 210 as illustrated in FIG. 9. As described above, in the battery pack case 10 of the present invention, the flow channels may be formed in at least a part of the frames 200 and 300 constituting the battery pack.

Here, the flow channel of the present invention may be configured in a multilayer structure in which a plurality of unit flow channels are stacked in a height direction (z-direction in FIG. 1, same as below) as illustrated. More specifically, describing the center beam flow channel 310C as an example, the inside of the center beam 310 may be formed in the form of a pipe having a hollow structure, and thus, may be formed in a hollow shape, and at least one partition wall partitioning the hollow inner space of the center beam into an upper space and a lower space is provided in the axial direction so that the hollow inner space may be divided into a plurality in the height direction.

As described above, each of the inner spaces of the center beams partitioned in the height direction and separated from each other corresponds to each of the center beam unit flow channels in the present invention. That is, in the present invention, a plurality of hollow structures separated from each other in the height direction along an axial direction may be formed inside the frame, and each hollow may be used as a unit flow channel. In addition, although not illustrated separately, the above-described cross beam flow channel 320C, the front beam flow channel 220C, and the rear beam flow channel 230C may also be configured in a multilayer structure in which the plurality of unit flow channels are stacked in the height direction in the same way. Hereinafter, in the present specification, if necessary, a unit flow channel of any one floor of the unit flow channels configured in the multilayer structure is represented by C_Un, and the unit flow channels are represented by C_U1, C_U2, . . . starting from the unit flow channel of the lowest floor.

Hereinafter, the battery pack of the present invention will be described with reference to specific exemplary embodiments. In particular, in the battery pack case 10 of the present invention, the center beam flow channel 310C corresponding to at least a part of the above-described flow channel inside the center beam 310 of the partition frame 300 disposed in the front-rear direction on the plate 100 may be formed.

Here, the above-described communication hole 203 may be formed on an inner sidewall of the center beam 310 located in each of the plurality of module spaces M described above, and each module space M may communicate with the center beam flow channel 310c through the communication hole 203. In this case, each module space M may communicate with at least one of a plurality of center beam unit flow channels 310C_U.

FIG. 10 is a conceptual diagram illustrating the connection relationship between the module space and the center beam unit flow channel. The communication holes 203 may be formed in the inner sidewalls of the center beams 220 located in each module space M, and each center beam unit flow channel 310C_U may communicate with each module space M through the corresponding communication hole 203.

For example, all the center beam unit flow channels 310C_U formed inside the center beam as illustrated in FIG. 10 may be formed to pass through each module space M, and when looking at any one module space M' as a reference, all the center beam unit flow channels 310C_U are formed inside the center beam 310 located in any one module space M' to pass therethrough. In this case, as illustrated, the communication hole 203 may be formed so that one module space M' communicates only with one center beam unit flow channel 310C_U, so different module spaces M' may communicate with the different center beam unit flow channels 310C_U, respectively, on a one-to-one basis.

In other words, the center beam flow channel includes a plurality of center beam unit flow channels separated from each other. When two center beam unit flow channels among the plurality of center beam unit flow channels are a first center beam unit flow channel and a second center beam unit flow channel, respectively, the center beam flow channel may include the first center beam unit flow channel and the second center beam unit flow channel separated from each other, and when the spaces adjacent to each other among the plurality of module spaces are referred to as the first module space and the second module space, the first module space may communicate with the first center beam flow channel, and the second module space may communicate with the second center beam flow channel. That is, in the battery pack of the present invention, any one unit flow channel communicating with any one of the plurality of module spaces and another unit flow channel communicating with another module space may be configured differently from each other, so each dedicated flow channel may be provided in each module space.

In this way, as a dedicated flow channel is provided in each module space, it is possible to prevent gas or the like generated in any one module space from flowing into another module space.

Meanwhile, referring back to FIG. 7, the center beam flow channel 310C may be configured in a multilayer structure in which the plurality of center beam unit flow channels 310C_U are stacked in the height direction. In this case, each of the plurality of center beam unit flow channels 310C_U may be configured in a structure partitioned left to right. That is, as illustrated, each center beam unit flow channel 310C_U is provided with a partition wall partitioning the inner space of the center beam unit flow channel 310C_U left and right, and thus, the left and right of each center beam unit flow channel 310C_U may be configured in a structure separated from each other with respect to the partition wall.

This separates the module space located on the left and the module space on the right with respect to the center beam 310 from each other, so it is possible to prevent the gas, the flame, or the like from being introduced from the module space located on the left or right with respect to the center beam 310 into the center beam flow channel 310C.

Furthermore, referring back to FIG. 7, the battery pack 10 according to the present invention may further include vent caps 400 each provided in both end portions of the center beam 310. A pair of vent caps 400 is provided on both end portions of the center beam 310, respectively, to completely close both end portions of the center beam flow channel 310C. Each vent cap 400 is provided with one or more vent holes 450 that penetrate through the vent caps 400 to make any one of one end and the other end of each center beam unit flow channel 310C_U communicate with the outside, so each center beam unit flow channel 310C_U may be configured so that any one of one end portion and the other end portion may be closed by the vent cap 400, and the other end portion may communicate with the outside by the vent hole 450.

In the present invention, the vent cap 400 is configured as a set of a front vent cap 410 and a rear vent cap 420. As each of the vent caps 410 and 420 is formed in a plate shape and is provided to cover one end and the other end of each of the plurality of center beam unit flow channels 310C_U, basically, opened one end or the other end of each center beam unit flow channel 310C_U is closed, but any one of one end and the other end of each center beam unit flow channel 310C_U communicates with the outside through the vent holes 450 formed in each vent cap 400, so any one of the one end or other end of each center beam unit flow channel 310C_U may be opened, and the other end may be closed.

That is, referring back to FIG. 10, the vent cap 400 includes a front vent cap 410 and a rear vent cap 420, respectively, and is provided in front and back of each center beam unit flow channel 310C_U, respectively. However, looking at one center beam unit flow channel 310C_U as a reference, a vent hole 450 is formed in the vent cap portion located at the front end (that is, one end portion of the unit flow channel) of the unit flow channel, and thus, the front end of the unit flow channel may communicate with the outside, and the vent hole 450 is not formed in the vent cap portion located at the rear end (that is, the other end portion of the unit flow channel) thereof, and thus, the rear end of the unit flow channel may be closed by the vent cap. In this way, as the front vent cap 410 and the rear vent cap 420 are each provided in the front and back of each unit flow channel 310C_U, the gas or the like that is generated from any one trigger module and introduced into each unit flow channel may be discharged in a desired direction.

Here, in the present invention, a guide member 500 may be further provided in each flow channel in order to guide the gas or the like, which is introduced from the trigger module into each flow channel, to the end portion formed with the vent hole 450. FIG. 11 is a diagram illustrating one center beam unit flow channel, a communication hole, and a guide member. FIG. 11 illustrates a center beam unit flow channel of any one floor among a plurality of center beam unit flow channels 310C_U having a layer structure formed inside the center beam 310, and FIG. 11 illustrates, in particular, a center beam unit flow channel 310C_U1 of a first floor, a communication hole 203 communicating with the unit flow channel 310C_U1, and a guide member 500 provided on the unit flow channel 310C_U1. As illustrated, the guide member 500 may be disposed at one point on each center beam unit flow channel 310C_U to guide gas or the like from one point to one end and the other end of each unit flow channel 310C_U which communicates with the outside. The shape of the guide member 500 may be formed in various ways, and the guide member may separate the inner space of the corresponding unit flow channel 310C_U in one direction and the other direction based on one point to perform a function of closing one of the two directions and opening the other direction. To this end, a height of the guide member 500 may be configured to be substantially the same as the height of each center beam unit flow channel 310C_U.

As described above, as the guide member is provided in each unit flow channel, when gas or the like generated from the trigger module and introduced into each unit flow channel moves to the end portion closed by the vent cap and then returns, the guide member may prevent the gas or the like from being introduced back into the module space where the trigger module is located, and may be combined with the function of the vent cap to reliably discharge gas in the desired direction.

Hereinafter, the exemplary embodiment will be described based on the above-described configurations of the present invention. According to the present invention, in particular, by making each of the plurality of center beam unit flow channels 310C_U each formed inside the center beam 310 communicate with each module space M on a one-to-one basis, so it is possible to provide one dedicated flow channel in each module space.

Specifically, the plurality of module spaces M may be arranged in two rows as illustrates in FIG. 1. In this case, among the plurality of module spaces M disposed in two rows, the number of each of the module spaces M_1 in the first row disposed on the left side of the center beam 310, and the number of each of the module spaces M_2 in the second row disposed on the right side of the center beam may be the same as the number of each of the center beam unit flow channels 310C_U formed inside the center beam. That is, for example, as illustrated in FIG. 1, when the number of module spaces M_1 in the first row and module spaces M_2 in the second row is four, the inner space of the center beam 310 also has a four-floor hollow structure, and may be provided with four center beam unit flow channels 310C_U1, 310C_U2, 310C_U3, and 310C_U4. Here, as described above, the inner space of each of the center beam unit flow channels 310C_U has a structure separated left and right, and thus, it is preferable that the module space M_1 in the first row and the module space M_2 in the second row do not communicate with each other, but is not limited thereto. As described above, according to the present invention, the left area and the right area have the same structure with respect to the center beam 310, so the battery pack case 10 may be formed in a symmetrical form, so the number of module spaces in the first row, the number of module spaces in the second column, and the number of each of the center beam unit flow channels may be the same.

In this case, the inner space of each of the module spaces M_1 in the first row may communicate with the plurality of center beam unit flow channels 310C_U through the communication hole 203 formed on the left sidewall of the center beam located in the module space in the first row on a one-to-one basis. That is, unlike the general case described above, according to this example, only one communication hole may be formed in the inner sidewall of the center beam located in each of the module spaces in the first row, so each of the module spaces M_1 in the first row may communicate with each of the center beam unit flow channels 310C_U on a one-to-one basis (refer to FIG. 10). In this way, since each module space M has the dedicated flow channel, each module space may be completely independent from each other module space, so it is possible to more safely protect the normal module from the trigger module by reliably blocking the gas or the like generated from the trigger module of any one module space from spreading to the other module space.

FIG. 12 is an exploded view of a case in which each center beam unit flow channel is shown for each floor, and illustrates each of the plurality of center beam unit flow channels 310C_U constituting a layer structure inside the center beam 310 for each layer. In this case, based on the drawing, the first-floor unit flow channel 310C_U1 formed at the bottom of the center beam may communicate with the module spaces located at the leftmost side of the first and second module spaces, the second-floor unit flow channel 310C_U2 formed on the upper layer of the first-floor unit flow channel may communicate with the third module spaces from the left among the first and second module spaces, the third-floor unit flow channel 310C_U3 formed on the upper layer of the second-floor unit flow channel may communicate with the second module spaces from the left among the first and second row module spaces, and the fourth-floor unit flow channel 310C_U4 formed on the upper layer of the third floor unit flow channel may communicate with the module spaces located on the rightmost among the first and second module spaces. As described above, according to the present invention, as any one module space communicates with any one unit flow channel on a one-to-one basis, each module space may have a dedicated flow channel.

In addition, in this example, as described above, the vent cap 400 may be provided at one end and the other end of the center beam 310, respectively, and furthermore, the guide member 500 may be further provided on each center beam unit flow channel 310C. Here, according to this example, the farther one of the distance from the communication hole 203 formed in each center beam unit flow channel 310C U to one end of the corresponding unit flow channel and the other end of the corresponding unit flow channel may communicate with the outside. That is, each center beam unit flow channel 310C_U may have a structure in which an end portion farther from the communication hole 203 communicates with the outside, and the vent hole 450 is provided in the vent cap 400 to correspond thereto. This is to allow the gas, etc., introduced into each center beam unit flow channel 310C_U through the communication hole 203 in each module space M to flow along the longest path until discharged to the outside. As the high-temperature and high-pressure gases, flame materials, or the like flow along the longest path of each center beam unit flow channel and the temperature decreases, when these gases, flame materials, or the like are discharged to the outside of the battery pack case 10, they may be discharged in a state with the lowest risk.

In addition, as illustrated in FIG. 12, as the first-floor unit flow channel 310C_U1 has a structure in which the end portion communicating with the outside is on the right side of the drawing, the second-floor unit flow channel 310C_U2 has a structure in which the end portion communicating with the outside is on the left side of the drawing, the third-floor unit flow channel 310C_U3 has a structure in which the end portion communicating with the outside is the right side of the drawing, and the fourth-floor unit flow channel 310C U4 has a structure in which the end portion communicating with the outside is on the left side of the drawing, the center beam unit flow channels 310C_U of two adjacent layers may be configured so that outlets are opposite to each other. This is to space the outlet (vent hole) between the respective unit flow channels as far as possible. It is possible to prevent the gas or the like discharged from any one unit flow channel from being introduced back into another unit flow channel through the outlet (vent hole) formed in the immediately adjacent upper or lower layer.

The center beam flow channel has been described in detail above, and the same structure may be applied to the side beam flow channel. Furthermore, the cross beam flow channel, the front beam flow channel, and the rear beam flow channel also have the multilayer structure in which the plurality of unit flow channels are stacked, and thus, may have a structure in which they communicate with each of the plurality of unit flow channels of the center beam flow channel and/or the side beam flow channel on a one-to-one basis.

Hereinafter, the battery pack including the battery module and the cover will be described in more detail. FIG. 13 is an exploded perspective view of the battery pack according to an exemplary embodiment of the present invention. As illustrated, the battery pack 1 of the present invention may include the battery pack case 10 described above, the plurality of battery modules 50 individually seated in the module space, the module space cover 20 covering the module space, and the battery pack cover 30 that covers the case 10 as a whole.

The module space cover 20 is provided on each of the upper portions of the plurality of module spaces M to shield each module space M, and may be provided in plurality by the number of each module space M. That is, the module space cover 20 may be located above each battery module 50 seated in each module space M to cover the upper portions of each battery module 50. Here, the module space cover 50 may include a fire-resistant, heat-resistant, non-combustible material. For example, such material may correspond to MICA, resin, EPDM, a composite material, a metal material, and the like. In this case, as illustrated, the module space cover 20 of the present invention may have a structure in which the plurality of covers are stacked in multiple layers.

The battery pack cover 30 may be provided on the upper portions of the plurality of module space covers 20 and the upper portion of the battery pack case 10 to shield the inner space of the battery pack case 10 as a whole, and may be configured of a plate of sufficient size to shield all the space inside the outer frame 200.

As described above, the upper cover covering the battery pack case 10 of the present invention may be configured of a double shielding structure that includes the plurality of module space covers 20 separated from each other for shielding each module space M and one battery pack cover 30 for shielding the inner space of the battery pack case 10 as a whole.

Furthermore, the battery module 50 applied to the present invention includes a pouch type battery cell assembly 51 in which pouch type battery cells are stacked with each other, and a module case 52 for fixing the battery cell assembly 51, and may have a structure in which the module case 52 is simplified so that the battery cell assembly 51 may be directly mounted on the battery pack case, that is, the plate of the battery pack case.

More specifically, FIG. 14 illustrates a battery module according to an example of the present invention. As illustrated, the battery module 50 of the present invention includes the pouch type battery cell assembly and the module case. In this case, the module case of the present invention may include a side cover 52_1 covering both side surfaces of the battery cell assembly 350, a front plate 52_2 covering the front surface, and a rear plate 52_3 covering the rear surface.

That is, the battery module of the present invention may not have an upper cover and a lower cover covering the upper and lower portions of the battery cell assembly unlike the general battery module, and in particular, may not have the lower cover. This may simplify the module case by removing unnecessary parts from the module case of the conventional battery module, and reduce the size of the battery module, thereby increasing the storage ratio of the battery cells to the total volume of the battery pack.

In addition, in the conventional battery module, a heat-conducting member (for example, a thermally conductive resin layer) is disposed on the upper portion of the lower cover of the module case, and thus, when the battery module is seated on the plate of the battery pack, the lower cover of the module case is disposed between the battery cell assembly and the plate, so the heat exchange performance between the battery cell assembly and the plate deteriorates. In order to solve this problem, there is a problem in that a second thermally conductive resin layer needs to be additionally provided between the battery module and the plate. On the other hand, the battery module of the present invention is formed in a structure in which the module case does not have the lower cover, and thus, the battery cell assembly and plate are in direct contact with each other. As a result, the battery module may have sufficient heat exchange performance even if only one thermally conductive resin layer is provided between the battery module and the plate without the need for the thermally conductive resin layer on the battery module itself to reduce the use of the thermally conductive resin layer, and at the same time, directly exchange heat between the battery cell assembly and the plate, thereby further improving the heat exchange performance.

According to the present invention, as flow channels are provided inside frames constituting the battery pack case, gas, flame, or the like generated during a thermal runaway situation is discharged to the outside through the flow channels, and accordingly, the propagation of the gas, the flame, or the like to other normal modules other than a trigger module is blocked, so the damage to the normal module may be minimized.

In addition, flow channels are formed inside frames corresponding to essential components of a battery pack case, that is, an outer frame and a partition frame, without adding a separate structure to discharge gas, flame, or the like, so there are advantages in terms of space utilization and economics.

Although exemplary embodiments of the present invention has been described with reference to the accompanying drawings, those skilled in the art will appreciate that various modifications and alterations may be made without departing from the spirit or essential feature of the present invention. Therefore, it should be understood that the above-mentioned embodiments are exemplary in all aspects but are not limited thereto.

The invention claimed is:

1. A battery pack, comprising:
a plate on which battery modules are disposed;
an outer frame formed on an outer side of the plate with a predetermined height; and
a partition frame partitioning an inner space formed by the plate and the outer frame into a plurality of module spaces,
wherein a flow channel through which a fluid flows is provided in at least one of the outer frame or the partition frame or combination thereof, wherein the partition frame includes a center beam disposed in a front-rear direction on the plate;
a center-beam flow channel is formed inside the center beam;
the center-beam flow channel has at least one of a first end and a second end in communication with an outside;
the center-beam flow channel comprises a plurality of center-beam unit flow channels; and
each of the plurality of center-beam unit flow channels is in a one-to-one communication with one of the plurality of module spaces.

2. The battery pack of claim 1, wherein the flow channel includes a first flow channel and a second flow channel separated from each other.

3. The battery pack of claim 2, wherein the plurality of module spaces include a first module space and a second module space adjacent to each other,
the first module space communicates with the first flow channel, and
the second module space communicates with the second flow channel.

4. The battery pack of claim 3, wherein the fluid includes a gas generated during a thermal runaway situation of the battery modules, and
a flow channel of the outer frame and a flow channel of the partition frame communicate with each other.

5. The battery pack of claim 1, wherein the partition frame includes a cross beam disposed in a left-right direction on the plate,
a cross beam flow channel is formed inside the cross beam, and
the cross beam flow channel communicates with a side beam flow channel formed inside a side beams that are each disposed on both sides of the plate in the left-right direction of the outer frame.

6. The battery pack of claim 1, wherein the partition frame includes a front beam disposed in a front and a rear beam disposed in a rear on the plate,
a front beam flow channel and a rear beam flow channel are each formed in at least one of the front beam and the rear beam, and
the front beam flow channel and the rear beam flow channel each communicate with the side beam flow channel.

7. The battery pack of claim 1, wherein the center beam flow channel has a multilayer structure in which a plurality of center beam unit flow channels are stacked in a height direction.

8. The battery pack of claim 7, wherein each of the plurality of center beam unit flow channels is partitioned left and right.

9. The battery pack of claim 5, wherein the outer frame includes side beams that are each disposed on both sides of the plate in the left-right direction,
a side beam flow channel is formed inside the side beam, and
at least one of one end and the other end of the side beam flow channel communicates with the outside.

10. The battery pack of claim 9, wherein the partition frame includes a cross beam flow channel disposed in the left-right direction on the plate,
a cross beam flow channel is formed inside the cross beam, and
the cross beam flow channel communicates with the side beam flow channel.

11. The battery pack of claim 9, wherein the partition frame includes a front beam disposed in a front and a rear beam disposed in a rear on the plate, a front beam flow channel and a rear beam flow channel are each formed in at least one of the front beam and the rear beam, and the front beam flow channel and the rear beam flow channel each communicate with the side beam flow channel.

12. The battery pack of claim 1, further comprising:

a plurality of module space covers that are provided on each of the upper portions of the plurality of module spaces to shield the respective module spaces; and a battery pack cover that is the upper portions of the plurality of module space covers and shields the battery pack as a whole.

13. The battery pack of claim 12, further comprising:

a battery module that is individually seated in each of the plurality of module spaces, wherein the battery module includes a battery cell assembly including a pouch type battery cell and a module case for fixing the battery cell assembly, and the pouch type battery cell is directly seated on the plate through a heat conduction member.

\* \* \* \* \*